US012140902B2

(12) United States Patent
Zhou

(10) Patent No.: US 12,140,902 B2
(45) Date of Patent: Nov. 12, 2024

(54) PROCESS CARTRIDGE

(71) Applicant: ZHUHAI DINGLONG HUITONG PRINT TECHNOLOGY CO., LTD, Guangdong (CN)

(72) Inventor: Honghui Zhou, Zhuhai (CN)

(73) Assignee: ZHUHAI DINGLONG HUITONG PRINT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/041,486

(22) PCT Filed: Aug. 16, 2021

(86) PCT No.: PCT/CN2021/112774
§ 371 (c)(1),
(2) Date: Feb. 13, 2023

(87) PCT Pub. No.: WO2022/037532
PCT Pub. Date: Feb. 24, 2022

(65) Prior Publication Data

US 2023/0236540 A1 Jul. 27, 2023

(30) Foreign Application Priority Data

Aug. 15, 2020 (CN) ......................... 202021699458.8
Jul. 7, 2021 (CN) ......................... 202121544684.3

(51) Int. Cl.
*G03G 21/16* (2006.01)
*G03G 21/18* (2006.01)

(52) U.S. Cl.
CPC ..... *G03G 21/1814* (2013.01); *G03G 21/1821* (2013.01)

(58) Field of Classification Search
CPC .. G03G 15/757; G03G 21/18; G03G 21/1814; G03G 21/1853; G03G 21/1821; G03G 21/1825
See application file for complete search history.

(56) References Cited

U.S. PATENT DOCUMENTS

2009/0003875 A1* 1/2009 Toba .................. G03G 21/1825 399/111
2011/0311272 A1 12/2011 Nittani et al.
2015/0253723 A1 9/2015 Morioka et al.

FOREIGN PATENT DOCUMENTS

CN 204731529 U 10/2015
CN 205121159 U 3/2016
(Continued)

OTHER PUBLICATIONS

International Search Report and Written Opinion from International Application No. PCT/CN2021/112774 mailed Nov. 18, 2021.

*Primary Examiner* — Hoang X Ngo
(74) *Attorney, Agent, or Firm* — Dorsey & Whitney LLP

(57) ABSTRACT

A process cartridge includes a developing cartridge having a developing roller; a drum cartridge having a photosensitive drum; and a first end cover and a second end cover. The developing cartridge is rotatably supported on the first end cover and the second end cover. A separation force receiving member mounted at the developing cartridge; the separation force receiving member includes a force-receiving portion, a force transmission portion and a sliding guide portion; the force-receiving portion is used for receiving an acting force that makes the developing cartridge rotate to the separation position; the sliding guide portion and the first end cover are arranged in a manner of being able to slide relative to each other; and when the separation force receiving member
(Continued)

slides relative to the first end cover, the force transmission portion synchronously drives the developing cartridge to rotate.

20 Claims, 6 Drawing Sheets

(56) References Cited

FOREIGN PATENT DOCUMENTS

| | | | |
|---|---|---|---|
| CN | 111459002 | A | 7/2020 |
| CN | 212569435 | U | 2/2021 |
| CN | 212569436 | U | 2/2021 |

* cited by examiner

PROCESS CARTRIDGE

CROSS-REFERENCE TO RELATED APPLICATIONS

This application is an U.S. national phase application under 35 U.S.C. § 371 of PCT International Patent Application No. PCT/CN2021/112774 filed on Aug. 16, 2021, which claims priority to Chinese Patent Application No. 202021699458.8 filed on Aug. 15, 2020 and Chinese Patent Application No. 202121544684.3 filed on Jul. 7, 2021. The contents of the above-identified applications are hereby incorporated herein in their entireties by reference.

TECHNICAL FIELD

The present disclosure relates to the technical field of imaging devices, and in particular to a processing cartridge for imaging devices.

BACKGROUND

Imaging devices form images on recording materials using electrophotographic image forming processes. Examples of imaging devices include electrophotographic copiers, electrophotographic printers (e.g., laser beam printers, LED printers), facsimile machines, word processors, etc. A processing cartridge detachably mounted into an imaging device is provided in the prior art, and such processing cartridges mainly include an integrated processing cartridge integrating a drum cartridge and a developing cartridge, and a split-type processing cartridge including only a drum cartridge or a developing cartridge, wherein the drum cartridge includes a photosensitive drum, and the developing cartridge includes a developing roller. In the integrated processing cartridge, the drum cartridge and the developing cartridge are generally rotatably connected to each other. During imaging operations, the developing roller is kept pressed against the photosensitive drum. In the case of the image device employing a developing method in which the developing roller is placed in contact with the photosensitive drum to develop a latent image on the photosensitive drum, the developing roller is kept pressed against a peripheral surface of the photosensitive drum. However, during non-imaging operations, such as when the photosensitive drum is cleaned, the developing roller and the photosensitive drum need to be separated (i.e., cleaning separation). Normally a cleaning time of the photosensitive drum is constant and preset by the imaging device.

As shown in FIG. 1, a separation force receiving member 106 capable of receiving a separation force from a separation force applying member 101 of an imaging device to separate a developing roller 104 of a developing cartridge 102 from a photosensitive drum 105 of a drum cartridge 103 is disclosed in the prior art, the separation force receiving member 106 is provided with a force applying portion 108 that exerts a force to the developing cartridge 102, and correspondingly, the developing cartridge 102 is provided with a force receiving portion 109 that receives the force from the force applying portion 108. During the cartridge is in the image forming operation, the force applying portion 108 on the separation force receiving member 106 and the force receiving portion 109 of the developing cartridge are in a separated state, so as to prevent the force applying portion 108 on the separation force receiving member 106 from abutting against the force receiving portion 109 of the developing cartridge 102 to force the developing cartridge 102 and cause poor contact between the photosensitive drum 105 and the developing roller 104.

Since the separation force applying member of the imaging device is movable in M and N directions, when the separation force applying member 101 moves in the M direction, the separation force applying member 101 contacts the separation force receiving member 106 and exerts a force to the separation force receiving member 106, so that the separation force receiving member 106 moves in the M direction, and when the separation force receiving member 106 moves a predetermined distance and contacts the developing cartridge 102, and then exerts a force to the developing cartridge 102 to rotate the developing cartridge 102 relative to the drum cartridge 103, and the developing roller 104 is separated from the photosensitive drum 105.

In the technical solution in the prior art, although the developing roller and the photosensitive drum can be separated when the photosensitive drum is cleaned, when the separation force applying member transmits force to the developing cartridge, it is necessary to push the separation force receiving member first and then the separation force receiving member slides a predetermined distance to contact with the developing cartridge, and then the developing cartridge is pushed to rotate by the separation force receiving member. Compared with the separation force applying member directly exerting force on the developing cartridge, under the condition that the cleaning time is constant, the technical solution of the prior art is prone to a problem of delay in the separation of the developing roller from the photosensitive drum during cleaning separation, which shortens the cleaning time of the photosensitive drum, thus photosensitive drum is not clean enough to cause printing defects.

SUMMARY

An object of the present disclosure is to provide a processing cartridge and a corresponding imaging device in which a separation force can drive a developing cartridge to rotate.

According to a first aspect of the present disclosure, a processing cartridge is provided, including a developing cartridge having a developing roller, a drum cartridge having a photosensitive drum, and a first end cover and a second end cover provided opposite to each other. The developing cartridge is rotatably supported on the first end cover and the second end cover, and is capable of rotating between a contact position where the developing roller is in contact with the photosensitive drum and a separation position where the developing roller is separated from the photosensitive drum. A first longitudinal end of the developing cartridge is mounted with a separation force receiving member, the separation force receiving member includes a force receiving portion, a force transmitting portion, and a sliding guide portion. The force receiving portion is configured to receive a force that enables the developing cartridge to rotate to the separation position, the force transmitting portion is movably connected to the developing cartridge. The sliding guide portion and the first end cover are relatively slidably provided, the force transmitting portion drives the developing cartridge to rotate synchronously when the separation force receiving member slides relative to the first end cover.

According to a second aspect of the present disclosure, a processing cartridge is provided, including a developing cartridge having a developing roller, a drum cartridge having a photosensitive drum, and a first end cover and a second end cover provided opposite to each other. The developing cartridge is rotatably supported on the first end cover and the second end cover, and is capable of rotating between a contact position where the developing roller is in contact with the photosensitive drum and a separation position where the developing roller is separated from the photosensitive drum. A first longitudinal end of the developing cartridge is mounted with a separation force receiving member, the separation force receiving member includes a force receiving portion and a force transmitting portion. The force receiving portion is configured to receive a force that enables the developing cartridge to rotate to the separation position, the force transmitting portion drives the developing cartridge to rotate when the separation force receiving member slides relative to the first end cover.

According to a third aspect of the present disclosure, a processing cartridge is provided, including a developing cartridge having a developing roller, a drum cartridge having a photosensitive drum, and a first end cover and a second end cover provided opposite to each other. The developing cartridge is rotatably supported on the first end cover and the second end cover, and is capable of rotating between a contact position where the developing roller is in contact with the photosensitive drum and a separation position where the developing roller is separated from the photosensitive drum. A first longitudinal end of the developing cartridge is mounted with a separation force receiving member, the separation force receiving member includes a force receiving portion, and the force receiving portion is configured to receive a force that enables the developing cartridge to rotate to the separation position. The force receiving portion has a force receiving surface facing the photosensitive drum, and the force receiving surface is configured to produce sliding frictional resistance in response to sliding relative to the force receiving surface.

According to a fourth aspect of the present disclosure, an imaging device is provided, including a separation force applying member and the processing cartridge according to any one of the first to third aspects of the present disclosure. When the separation force applying member exerts force to the separation force receiving member of the processing cartridge, the separation force applying member is in contact with the force receiving portion of the separation force receiving member to separate the developing roller of the processing cartridge from the photosensitive drum of the processing cartridge.

Compared with conventional processing cartridges, in the processing cartridge provided by the embodiments of the present disclosure, the separation force receiving member cooperating with the separation force applying member in the imaging device is provided on the developing cartridge, and separation force receiving member has the force transmitting portion in contact with the developing cartridge, and the force transmitting portion can drive the developing cartridge to rotate synchronously when the force receiving portion of the separation force receiving member receives the separation force of the separation force applying member, and the developing roller to be separated from the photosensitive drum synchronously, thereby preventing a delay during cleaning separation. However, in the prior art, since the separation force receiving member needs to slide a certain distance to contact the developing cartridge before pushing the developing cartridge, which tends to delay the separation of the developer roller from the photosensitive drum during cleaning separation, so that the cleaning time of the photosensitive drum is shortened, and the photosensitive drum is prone to be cleaned uncleanly.

In the processing cartridge provided by the embodiments, the force receiving surface with a high coefficient of friction can produce sliding frictional resistance in response to sliding relative to the force receiving surface, and an external separation force applying member will not slip when continuously acting on the force receiving surface, which prevents a risk of detachment of the separation force receiving member during a stress process and ensures an imaging effect.

DETAILED DESCRIPTION OF THE EMBODIMENTS

The present application will now be described in detail with reference to the accompanying drawings and embodiments in order to make the objects, technical solutions, and advantages of the present application clearer. It should be understood that the specific embodiments described herein are only for explaining the present application, and not intended to limit the present application.

The processing cartridge provided in a first aspect embodiment of the present disclosure is illustrated below in conjunction with the accompanying drawings.

Figure 1:
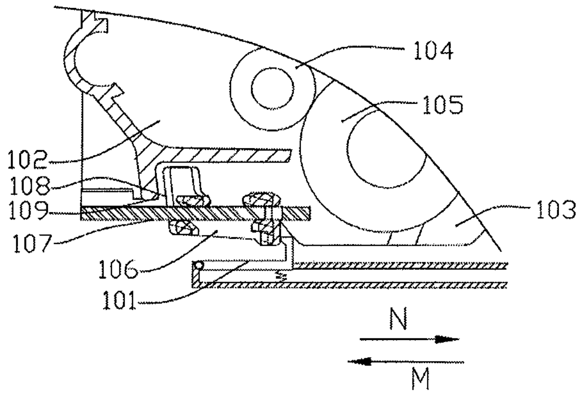
FIG. 1 is a schematic view of cooperation between a separation force receiving member of a processing cartridge mounted to an imaging device and a separation force applying member of the imaging device in the prior art.
Figure 2:
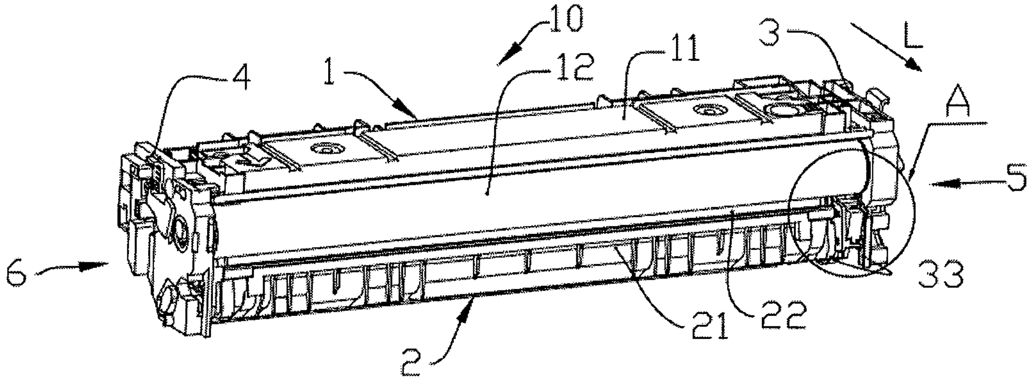
FIG. 2 is an overall view of the processing cartridge according to an embodiment.

As shown in FIG. 2, the processing cartridge 10 includes a drum cartridge 1, a developing cartridge 2, a first end cover 3, and a second end cover 4. The drum cartridge 1 includes a drum cartridge frame 11, a photosensitive drum 12, and a charging roller (not shown). The drum cartridge frame 11 is provided with a waste toner bin (not shown), and the photosensitive drum 12 is rotatably supported on the drum cartridge frame 11. The developing cartridge 2 includes a developing cartridge frame 21, a developing roller 22, and a powder feeding roller (not shown). The developing cartridge frame 21 is provided with a powder bin for containing developers, and the developing roller 22 can move along with the developing cartridge frame 21. The drum cartridge 1 and the developer cartridge 2 are connected in a relatively rotatable manner. The first end cover 3 is located at a first end 5 of the processing cartridge 10 in a length direction thereof (a direction parallel to an axial direction of the developing roller), and the second end cover 4 is located at a second end 6 of the processing cartridge 10 in the length direction. The first end 5 and the second end 6 are opposite in the length direction of the developing cartridge. At least one of the first end cover 3 and the second end cover 4 may be provided separately from the drum cartridge frame 11, or may be integrally formed with the drum cartridge frame 11. That is, either end cover of the first end cover 3 and the second end cover 4 is provided separately from the drum cartridge frame 11, while the other end cover is integrally formed with the drum cartridge frame 11. Alternatively, both of the first end cover 3 and the second end cover 4 are integrally formed with the drum cartridge frame 11.

In this embodiment, the first end cover 3 is integrally formed with the drum cartridge frame 11, the second end cover 4 is provided separately from the drum cartridge frame 11. The developing cartridge 2 is rotatably supported on the first end cover 3 and the second end cover. 4, so that the developing cartridge 2 can rotate between a contact position where the developing roller 22 is in contact with the photosensitive drum 12 and a separation position where the developing roller 22 is separated from the photosensitive drum 12.

Figure 3:
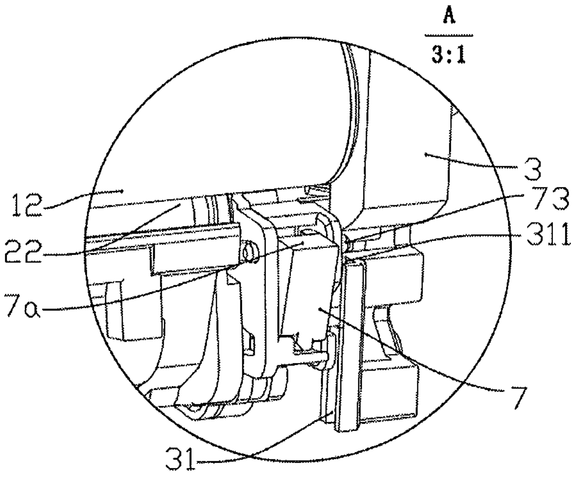
FIG. 3 is an enlarged view of part A in FIG. 2.

As shown in FIG. 2 and FIG. 3, a guide groove 31 extending linearly is provided on a side of the first end cover 3 facing the second end cover 4. In this embodiment, an extending direction of the guide groove 31 is perpendicular to a mounting direction L of the processing cartridge 10 and the length direction of the processing cartridge 10. An opening 311 is provided at an end of the guide groove 31 adjacent to the photosensitive drum 12.

Figure 4:
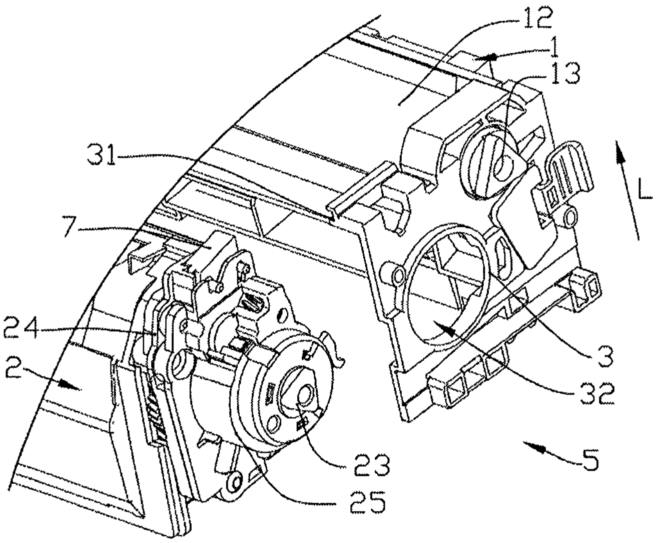
FIG. 4 is a partial exploded view of the processing cartridge according to an embodiment.

As shown in FIGS. 2 to 4, the drum cartridge 1 further includes a photosensitive drum driving force coupling member 13. One end of the photosensitive drum driving force coupling member 13 is connected to the photosensitive drum 12, and the other end thereof can cooperate with a driving component (not shown) in a main body of an imaging device and receive driving force from the driving component. The developing cartridge 2 further includes a developing roller driving force coupling member 23 provided at a first longitudinal end in a length direction of the developing cartridge (i.e., a longitudinal direction of the developing cartridge), a bearing plate 24 that rotatably supports the developing roller 22 and the developing roller driving force coupling member 23, and a gear cover 25. One end of the developing roller driving force coupling member 23 is connected to the developing roller 22 and a powder feeding roller (not shown), and the other end thereof can receive the driving force from the driving component of the imaging device, so as to drive the developing roller 22, the powder feeding roller, etc. to rotate.

In this embodiment, one end of the processing cartridge 10 having the developing roller driving force coupling member 23 in the length direction is the first end 5 of the processing cartridge 10, and the other end of the processing cartridge 10 opposite to the first end 5 is the second end 6 of the processing cartridge 10. The gear cover 25 is located between the first end cover 3 and the bearing plate 24. One side of the gear cover 25 in the length direction of the processing cartridge 10 is fixedly connected to the developing cartridge frame 21 and covers a developing roller gear (not shown) and a powder feeding roller gear, etc., and the other side thereof is connected to a circular mounting hole 32 of the first end cover 3, so that the developing cartridge 2 can rotate around a center of the mounting hole 32. The bearing plate 24 is located between the gear cover 25 and the developing cartridge frame 21, and is fixed to a side end of the developing cartridge frame 21 and can rotate with the developing cartridge frame 21.

Figure 5:
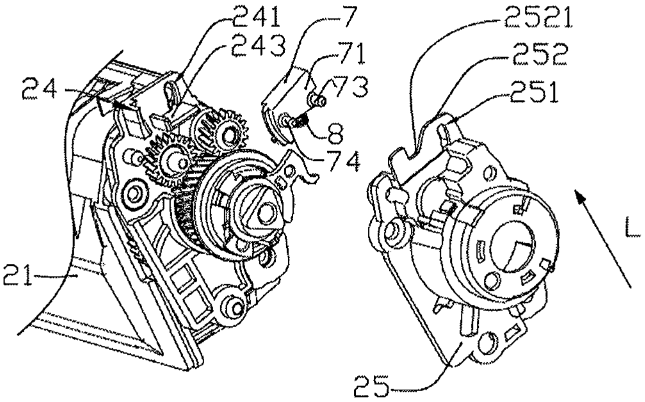
FIG. 5 is a partial exploded view of an end of a developing cartridge according to an embodiment.

As shown in FIG. 5, a first connection groove 241 is provided through a surface of the bearing plate 24 perpendicular to the length direction of the processing cartridge 10, a second connection groove 251 is provided through a surface of the gear cover 25 perpendicular to the length direction of the developing cartridge, and a U-shaped groove 2521 is formed on a bottom edge 252 of the gear cover 25 along the mounting direction L of the processing cartridge 10. The first connection groove 241 and the second connection groove 251 face each other and are parallel to each other. A support surface 243 is provided on a side of the bearing plate 24 adjacent to the gear cover 25 in the length direction of the processing cartridge 10, the support surface 243 is perpendicular to a side of the bearing plate 24, and the support surface 243 extends from the side of the bearing plate 24 along the length direction of the processing cartridge 10 to a direction close to the gear cover 25. The arrangement of the U-shaped groove 2521 makes the assembly of the separation force receiving member 7 more convenient.

As shown in FIGS. 3 to 6, the processing cartridge 10 further includes a separation force receiving member 7 at the first longitudinal end in the length direction of the developing cartridge 2 (i.e., the longitudinal direction of the developing cartridge) and a first resilient member.

In this embodiment, the separation force receiving member 7 is mounted on the developing cartridge 2 and is located between the bearing plate 24 and the gear cover 25. The separation force receiving member 7 includes a force receiving portion, an anti-rotation portion, a sliding guide portion, and a force transferring portion. The force receiving portion is configured to receive a force that enables the developing cartridge 2 to rotate from the contact position to the separation position, and the sliding guide portion cooperates with the guide groove 31 to guide the separation force receiving member 7 to slide in a preset direction. When the separation force receiving member 7 slides along the guide groove 31, the force transferring portion can drive the developing cartridge 2 to rotate synchronously. In this embodiment, the force receiving portion has a force receiving surface 7*a* perpendicular to the extending direction of the guide groove 31.

The separation force receiving member 7 has a first side 71 and a second side 72 in the length direction of the processing cartridge 10. The first side 71 faces the gear cover 25, the second side 72 faces the bearing plate 24, and the first side 71 and the second side 72 are parallel to each other.

In this embodiment, the anti-rotation portion is a first protrusion 73 provided on the first side surface 71, the force transferring portion is the second protrusion 75 provided on the second side surface 72, and the sliding guide portion is a third protrusion 74 provided on the first side surface 71. Projections of the first protrusion 73 and the second protrusion 75 in the length direction of the processing cartridge 10 coincide. In the length direction of the processing cartridge 10, the first protrusion 73 is inserted into the second connection groove 251 and forms a movable connection with the gear cover 25, and the first protrusion 73 is in contact with a wall of the second connection groove 251. The second protrusion 75 is inserted into the first connection groove 241 and forms a movable connection with the bearing plate 24, and the second protrusion 75 is in contact with a wall of the first connection groove 241 to drive the developing cartridge 2 to rotate synchronously when the separation force receiving member 7 slides along the guide groove 31. The third protrusion 74 extends through and abuts against the U-shaped groove 2521, an end of the third protrusion 74 is inserted into the guide groove 31, such that the third protrusion 74 can slide along the guide groove 31.

By providing the first protrusion 73 and the second protrusion 75 on both sides of the separation force receiving member 7, the effect of applying force can be increased, so that the sliding of the separation force receiving member 7 is more stable.

In this embodiment, the first protrusion 73 has an initial position aligned with the guide groove 31. When the developer cartridge 10 is in the contact position, the first protrusion 73 is located at the initial position. In this initial position, the first protrusion 73 is not limited by the guide groove 31 and the second protrusion 75 on the other side is movably connected to the first connection groove 24, so that the separation force receiving member 7 can rotate around the third protrusion 74. When the developing cartridge 10 rotates from the contact position to the separation position, the first protrusion 73 enters the guide groove 31 from the initial position through the opening 311 to prevent the separation force receiving member 7 from rotating.

In this embodiment, the first protrusion 73 can be inserted into the guide groove 31, and it can play a role of guiding the separation force receiving member 7 to slide along the guide groove 31 together with the third protrusion 74. In addition, the first protrusion 73 is in contact with a wall of the second connection groove 251, when the separation force receiving member 7 slides along the guide groove 31, the first protrusion 73 and the second protrusion 75 provided on the other side drive the developing cartridge 2 to rotate synchronously.

The separation force receiving member 7 is further provided with a receiving chamber 76 for mounting the first resilient member resilient member. An opening of the receiving chamber 76 faces the support surface 243 of the bearing plate 24, and a bottom surface of the receiving chamber 76 is provided with a mounting protrusion 77. The mounting protrusion 77 protrudes from the bottom surface 761 of the accommodation cavity 76 in a direction close to the support surface 243 of the bearing plate 24. The processing cartridge 10 further includes a first resilient member having a resilient force on the separation receiving member 7, the first resilient member can be a compression spring or a resilient foam. In this embodiment, the first resilient member is a compression spring 8 sleeved on the mounting protrusion 77. One free end of the compression spring 8 is located in the receiving chamber 76 and abuts against the bottom surface of the receiving chamber 76, and the other end thereof abuts against the supporting surface 243 of the bearing plate 24. The compression spring 8 is in a state of being compressed by the separation force receiving member 7 and the supporting surface 243, which has a resilient force on the separation force receiving member 7. When the developing cartridge 10 is in the contact position, the separation force receiving member 7 is subjected to an action of the compression spring 8, and the first protrusion 73 is kept in the initial position. The compression spring 8 is configured to be further compressed when the separation force receiving member 7 is subjected to a force in a direction opposite to the mounting direction L of the processing cartridge 10, and when the external force is removed, the compression spring 8 is resiliently recovered, so as to enable the first projection 73 to return to the initial position.

Figure 6:
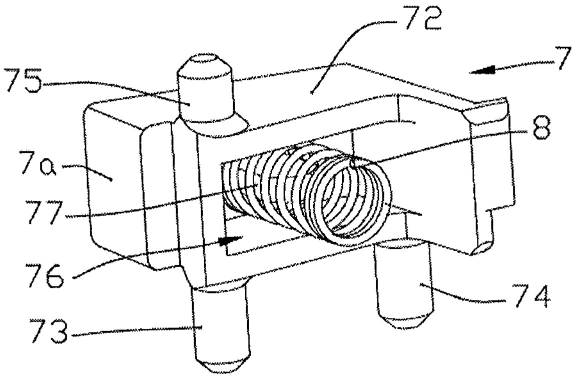
FIG. 6 is an assembly view of the separation force receiving member and a resilient member of the processing cartridge according to an embodiment.

As shown in FIGS. 4 to 6, in the state where the separation force receiving member 7 is mounted on the processing cartridge 10, in the mounting direction L of the processing cartridge 10, the separation force receiving member 7 is subjected to the resilient force of the compression spring 8. The first protrusion 73, the second protrusion 75, and the third protrusion 74 of the force receiving member 7 are limited by the second connection groove 251, the first connection groove 241, and the U-shaped groove 2521, respectively, so as to prevent the separation force receiving member 7 from detaching from the processing cartridge 10, so that the separation force receiving member 7 is kept in an initial state.

During the assembly process of the processing cartridge 10, the bearing plate 24, the separation force receiving member 7, and the gear cover 25 may be sequentially mounted on the developing cartridge 2. Specifically, the bearing plate 24 can be fixedly mounted on the developing cartridge frame 21 first, and then the second protrusion 75 of the separation force receiving member 7 mounted with the compression spring 8 is aligned with and inserted into the first connection groove 241, the gear cover 25 can be further mounted on the gear cover 25 on the developing cartridge frame 21, and the first protrusion 73 of the separation force receiving member 7 is inserted through the second connection groove 251, so that the separation force receiving member 7 is kept between the bearing plate 24 and the gear cover 25. Finally, the first end cover 3 is mounted so that the third protrusion 74 of the separation force receiving member 7 is inserted into the guide groove 31 on the first end cover 3, and the first protrusion 73 is aligned with the guide groove 31 (that is, the first protrusion 73 can be aligned and inserted into the guide groove 31 when the developing cartridge 2 rotates). It can be seen that the separation force receiving member 7 of this structure is easy to assemble and may be adapted to automated production processes.

Figure 7:
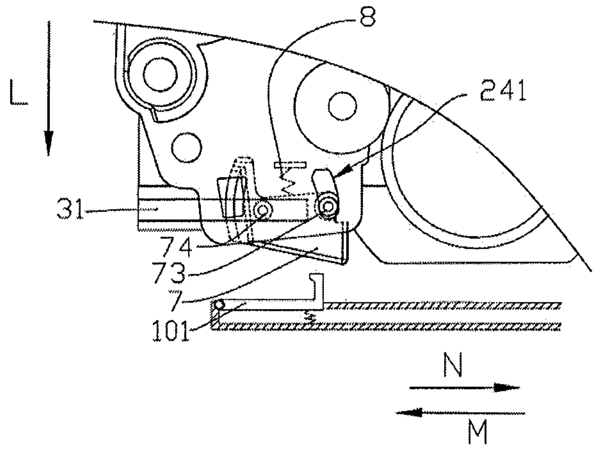
FIG. 7 is a schematic view (partial perspective) before the separation force receiving member is in contact with the separation force applying member of the imaging device during a process of mounting the processing cartridge to the imaging device according to an embodiment.
Figure 8:
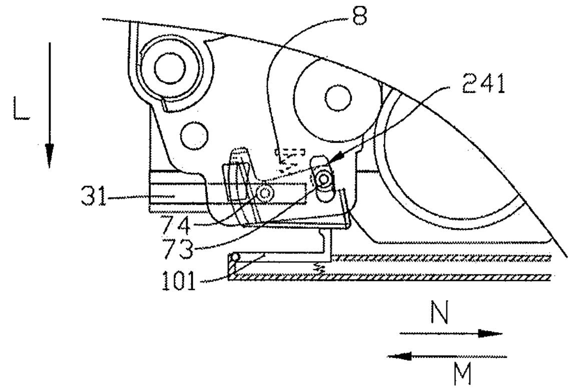
FIG. 8 is a schematic view (partial perspective) of a contact between the separation force receiving member and the separation force applying member of the image device during the process of mounting the processing cartridge to the image device according to an embodiment.
Figure 9:
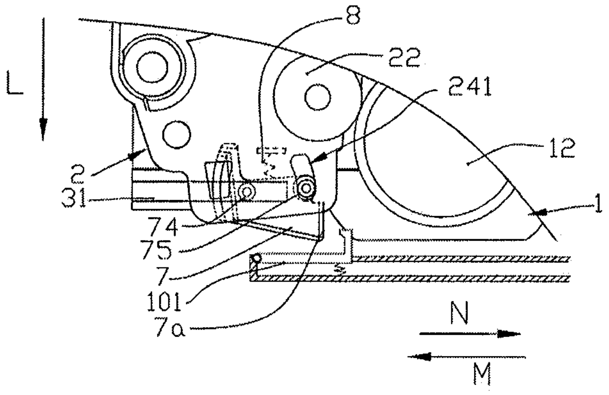
FIG. 9 is a first schematic view (partial perspective) of cooperation between the separation force applying member and the separation force receiving member when a developing roller and a photosensitive drum of the processing cartridge provided are separated according to an embodiment.
Figure 10:
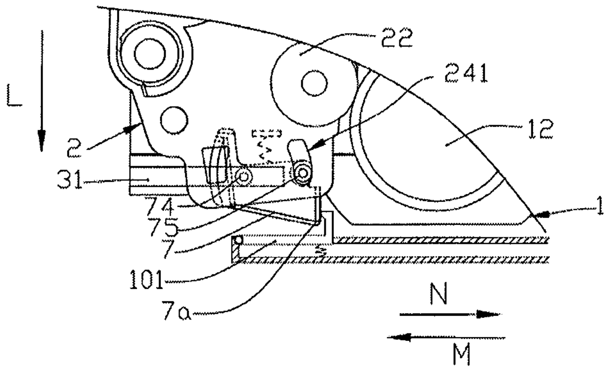
FIG. 10 is a second schematic view (partial perspective) of a cooperation between the separation force applying member and the separation force receiving member when the developing roller and the photosensitive drum of the processing cartridge are separated according to an embodiment.

As shown in FIGS. 7 to 9, the processing cartridge 10 of this embodiment is detachably mounted in an imaging device (not shown) having a separation force applying member 101. The separation force applying member 101 is movable in horizontal M and N directions under the control of the imaging device. When the separation force applying member 101 moves in the M direction, it can exert a separation force to the processing cartridge 10.

Referring to FIGS. 5 and 6, when the processing cartridge 10 is mounted to the imaging device along the mounting direction L, the separation force receiving member 7 is in contact with the separation force applying member 101, and the separation force receiving member 7 is subjected to a pressing force in a direction opposite to the mounting direction L. Since the first protrusion 73 of the separation force receiving member 7 is in the initial position aligned with the guide groove 31, the first protrusion 73 is not limited by the guide groove 31.

The separation force receiving member 7 may have a protruding state in which it protrudes relative to the developing cartridge 2 and a retracting state in which it is retracted into the developing cartridge 2. Specifically, the separation force receiving member 7 can be switched between the protruding state and the retracting state during mounting of the developing cartridge 2. Specifically, referring to FIG. 7 and FIG. 8, under the force of the separation force applying member 101, the first protrusion 73 and the second protrusion 75 of the separation force receiving member 7 move along the second connection groove 251 and the first connection groove 241, respectively. An end of the third protrusion 74 is restricted by the guide groove 31, so that the separation force receiving member 7 rotates around the third protrusion 74. The side of the force receiving member 7 in contact with the force applying member 101 overcomes the resilient force of the compression spring 8 and retracts towards an interior of the developing cartridge 2.

Referring to FIG. 9, when the separation force applying member 101 moves along the N direction and an upper end of the separation force applying member 101 crosses over the separation force receiving member 7, the separation force receiving member 7 pops out under the elastic restoring force of the compression spring 8. The side of the separation force receiving member 7 that is in contact with the separation force applying member 101 can be retracted toward the interior of the developing cartridge, which prevents the separation force applying member 101 from interfering with the separation force receiving member 7 when moving along the N direction. In addition, the separation force receiving member 7 may collide with components inside a machine during the mounting process, and the separation force receiving member 7 is configured so that, in the event of a collision, the side that is in contact with the separation force applying member 101 retracts toward the interior of the developing cartridge 2, which can play a role of buffering collisions and prevent the separation force receiving member 7 from being damaged.

Figure 11:
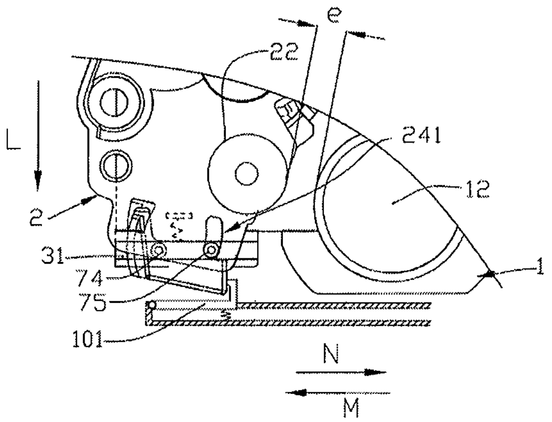
FIG. 11 is a schematic view (partial perspective) of cooperation of the separation force applying member and the separation force receiving member when the developing roller and the photosensitive drum of the processing cartridge are in contact according to an embodiment.
Figure 12:
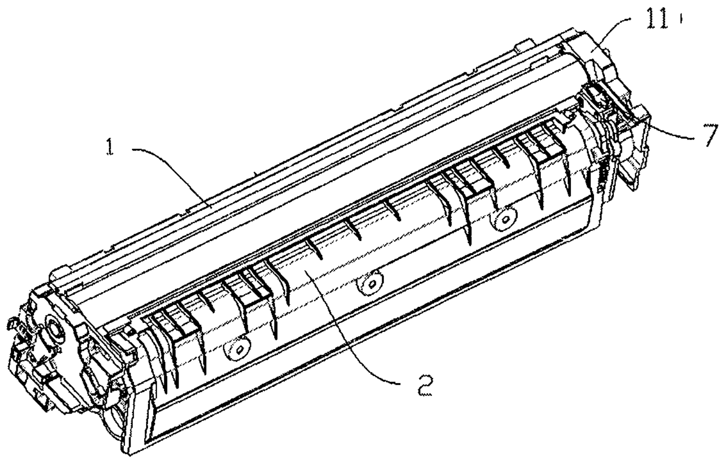
FIG. 12 is a schematic view of the processing cartridge according to an embodiment.
Figure 13:
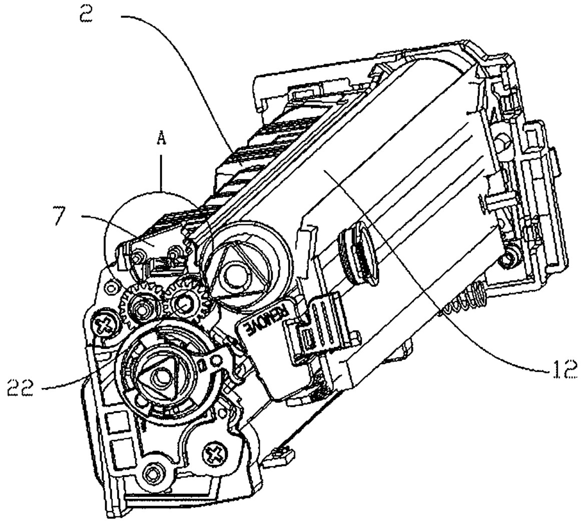
FIG. 13 is a schematic view of the processing cartridge provided in FIG. 12 after removing the drum cartridge frame.

As shown in FIGS. 3 to 5 and FIGS. 9 to 11, when the processing cartridge 10 is in a working state of forming an image, the developing roller 22 is in contact with the photosensitive drum 12. During clean and separation, referring to FIG. 10 and FIG. 11, the separation force applying member 101 moves along the M direction, the separation force applying member 101 is in contact with the force receiving surface 7*a* and exerts a separation force to the force receiving surface 7*a*, so that when the separation force receiving member 7 slides along the M direction, the first protrusion 73 and the second protrusion 75 drive the developing cartridge 2 to rotate synchronously relative to the drum cartridge 1, and the developing roller 22 and the photosensitive drum 12 are separated. Specifically, when the separation force receiving member 7 receives the separation force from the separation force applying member 101 and slides, the separation force receiving member 7 slides along the guide groove 31. Since the first protrusion 73 and the second protrusion 75 abut against the gear cover 25 and the bearing plate 24, respectively, the first protrusion 73 and the second protrusion 75 push the developing cartridge 2 to rotate synchronously, and the first protrusion 73 of the separation force receiving member 7 moves from the initial position through the opening 311 of the guide groove 31 to slide with the guide groove 31 to prevent the separation force receiving member 1 from rotating. The first protrusion 73 and the third protrusion 74 of the separation force receiving member 7 slide along the guide groove 31 and drive the developing cartridge 2 to rotate synchronously, so that the developing roller 22 and the photosensitive drum 12 are separated. As shown in FIG. 11, the developing roller 22 and the photosensitive drum 12 are separated. A separation gap e is provided between the developing roller 22 and the photosensitive drum 12. In the process that the separation force receiving member 7 receives the separation force of the separation force applying member 101 to be moved, since the first protrusion 73 and the second connection groove 251, the second protrusion 75 and the first connection groove 241, and the third protrusion 74 and the U-shaped groove 2521 are movably connected, and the first protrusion 73 and the third protrusion 74 of the separation force receiving member 7 are slidably inserted into the guide groove 31, the separation force receiving member 7 can be kept moving in the M direction and does not rotate with the developing cartridge frame 21 when the separation force applying member 101 pushes the processing cartridge 10 to move.

When the separation force applying member 101 moves in the N direction, the separation force receiving member 7 can slide along the guide groove 31 along the N direction to return the initial state under the action of the second resilient member 30 arranged between the developing cartridge 2 and the drum cartridge 1. At this time, the developing roller 22 and the photosensitive drum 12 are in contact again.

Optionally, a sliding track of the separation force receiving member 7 along the guide groove 31 may be configured to be parallel to the horizontal M and N directions of the separation force applying member 101 in a state where the processing cartridge 10 is mounted to the imaging device, or the sliding track may be configured to be oriented at an angle to the horizontal M and N directions, as long as the separation of the developing cartridge 2 from the photosensitive drum 12 can be achieved.

Optionally, the first protrusion 73 can also be removed, and the third protruding portion 74 can be configured as a block that cooperates with the guide groove 31, which can also guide the separation force receiving member 7 to slide along the guide groove 31.

Optionally, it is only a preferred solution to provide the protrusion on the separation force receiving member 7 to cooperate with the groove on the bearing plate 24. In the case that the separation force receiving member 7 is provided with the groove, and the bearing plate 24 is provided with the protrusion that cooperates with the groove on the separation force receiving member 7, the effect of this embodiment can also be achieved.

Optionally, the force receiving portion can also be provided at other positions of the separation force receiving member 7 in contact with the developing cartridge 2, as long as it can drive the developing cartridge 2 to rotate synchronously.

Compared with conventional processing cartridges, in the processing cartridge provided by the embodiments of the present disclosure, the separation force receiving member cooperating with the separation force applying member in the imaging device is provided on the developing cartridge, and separation force receiving member has the force transmitting portion in contact with the developing cartridge, and the force transmitting portion can drive the developing cartridge to rotate synchronously when the force receiving portion of the separation force receiving member receives the separation force of the separation force applying member, and the developing roller to be separated from the photosensitive drum synchronously, thereby preventing a delay during cleaning separation. However, in the prior art, since the separation force receiving member needs to slide a certain distance to contact the developing cartridge before pushing the developing cartridge, which tends to delay the separation of the developer roller from the photosensitive drum during cleaning separation, so that the cleaning time of the photosensitive drum is shortened, and the photosensitive drum is prone to be cleaned uncleanly.

The separation force receiving member is arranged to slide along the guide groove, and does not rotate with the developing cartridge, so that the force receiving portion of the separation force receiving member can be stably contacted with the separation force applying member, and the force receiving portion of the separation force receiving member may not be provided with a concave surface or an inclined surface to cooperate with the separation force applying member. The force receiving surface is arranged perpendicular to the guide groove, and in the state where the processing cartridge is mounted to the imaging device, the force receiving surface is perpendicular to the horizontal M and N directions of the separation force applying member, which is compared with the force receiving surface being provided as a concave surface, a situation where the separation force applying member and the separation force receiving member are stuck when the processing cartridge is taken out is avoided. In the case that the separation force receiving member rotates with the developing cartridge, the force receiving surface is perpendicular to the horizontal M and N directions of the separation force applying member, the force-receiving surface is likely to disengage from the separation force applying member during the rotation of the developing cartridge.

In an embodiment, the force receiving portion has the force receiving surface 7*a* facing the photosensitive drum 12, and the force receiving surface 7*a* is configured to produce sliding frictional resistance in response to sliding relative to the force receiving surface 7*a*. The force receiving surface 7*a* may be perpendicular to the direction of the force that enables the developing cartridge 2 to rotate.

It should be noted that, the separation force receiving member of the above embodiment may not be able to stably receive the separation force exerted by the separation force applying member during use. Specifically, the force receiving surface of the separation force receiving member of the above-mentioned embodiment is usually a straight face parallel to the mounting direction of the processing cartridge. However, after the developing cartridge is rotated and separated, the straight face tends to disengage from the separation force applying member, and a tripping phenomenon occurs, resulting in an incomplete separation of the developing roller and the photosensitive drum. Therefore, for this problem, on the basis of the separation force receiving member of the above-mentioned embodiment, the force receiving surface 7*a* in the processing cartridge 10 of the present embodiment has a certain coefficient of friction, which can produce sliding frictional resistance in response to the sliding of the external separation force applying member 101 relative to the force receiving surface 7*a*.

Referring to FIGS. 12 to 15, when the separation force applying member 101 acts on the force receiving surface 7*a* of the separation force receiving member 7, the developing cartridge 2 rotates toward a direction away from the photosensitive drum 12 under the action of the separation force. An acting direction of the separation force applying member 101 is a straight line away from the photosensitive drum 12. The separation force receiving member 7 has a tendency to move circumferentially along a rotation axis on the developing cartridge 2, and may have a tendency to gradually disengage from the separation force applying member downward, and the force receiving surface 7*a* with a certain coefficient of friction enhances the frictional resistance between the separation force receiving member 7 and the separation force applying member 101, which prevents the separation between the separation force receiving member 7 and the separation force applying member 101 and ensures that the separation force applying member 101 continues to act on the developing cartridge 2.

In the processing cartridge provided by this embodiment, the force receiving surface with a high coefficient of friction can produces sliding friction resistance in response to sliding relative to the force receiving surface, and the external separation force applying member does not slip when continuously acting on the force receiving surface, which prevents a risk of detachment of the separation force receiving member during the stress process, and ensures the imaging effect.

Figure 16:
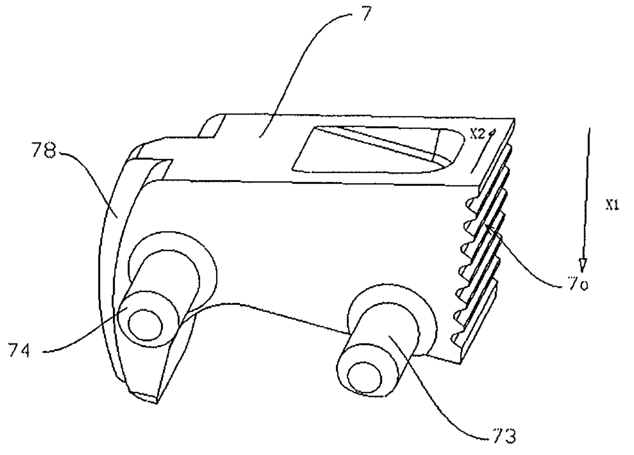
FIG. 16 is a schematic view of the separation force receiving member according to an embodiment.
Figure 17:
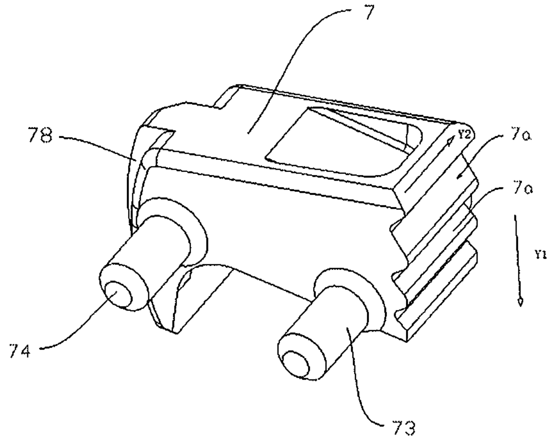
FIG. 17 is a schematic view of the separation force receiving member according to another embodiment.
Figure 18:
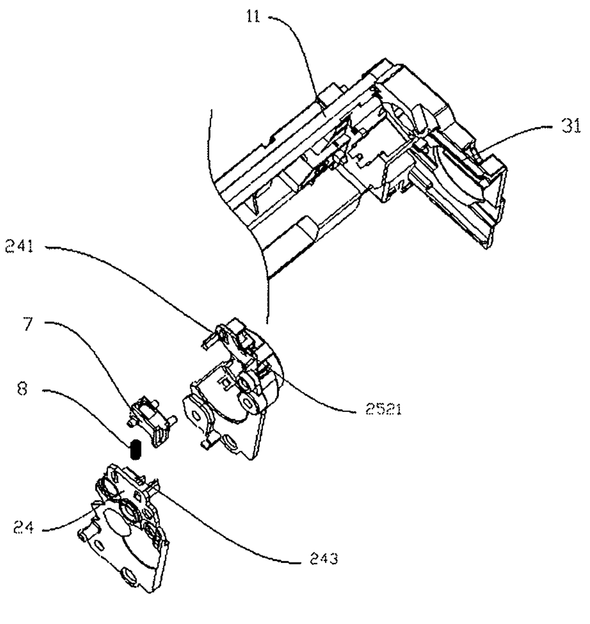
FIG. 18 is an assembly view of an assembly structure of the separation force receiving member according to an embodiment.

In an embodiment, referring to FIG. 16 and FIG. 17, the force receiving surface 7*a* is serrated, and an arrangement direction of serrations is perpendicular to a rotation axis of the developing roller 22. Alternatively, the force receiving surface 7*a* is wavy, and the arrangement direction of waves is perpendicular to the rotation axis of the developing roller 22.

In an embodiment, referring to FIG. 16, the force receiving surface 7*a* is serrated, and an angle formed between the arrangement direction of the serrations (i.e., the direction X1 in FIG. 16) and the rotation axis of the developing roller 22 is 45° to 135°. That is, the arrangement direction of the serrations is perpendicular or approximately perpendicular to the rotational axis of the developing roller 22. The serrated shape can increase the friction coefficient of the force receiving surface 7*a*, so as to improve the sliding friction resistance of the force receiving surface 7*a*.

Specifically, the extension directions of the serrations contained in the force receiving surface 7*a* may be in the following two directions. First, the serrations extend in a direction parallel to the rotation axis of the developing roller 22 (i.e., the direction X2 in FIG. 16). Second, the serrations extend in a direction intersecting the rotation axis of the developing roller 22, and an intersection angle between a straight line in which the serration extend and the rotation axis of the developing roller 22 is less than 45°. The above structure allows the external force applying member 101 to act on the force-receiving surface 7*a* through a hook portion thereof, and the hook portion can be stuck between adjacent serrations, so as to maintain the force application effect of the separation force applying member 101 on the separation force receiving member 7.

In an embodiment, referring to FIG. 17, the force receiving surface 7*a* is wavy, and the angle formed between the arrangement direction of the waves (i.e., the direction Y1 in FIG. 16) and the rotation axis of the developing roller 22 is 45° to 135°. That is, the arrangement direction of the waves is perpendicular or substantially perpendicular to the rotation axis of the developing roller 2. The wavy shape can also increase the friction coefficient of the force receiving surface 7*a*, so as to improve the sliding friction resistance of the force receiving surface 7*a*.

Specifically, the extension directions of the waves contained in the force receiving surface 7*a* may be in the following two directions. First, the waves extend in a direction parallel to the rotation axis of the developing roller 2 (i.e., the direction Y2 in FIG. 17). Second, the waves extend in a direction intersecting the rotation axis of the developing roller 22, and an intersection angle between a straight line in which the waves extend and the rotation axis of the developing roller 22 is less than 45°. The above structure allows the external force applying member 101 to act on the force-receiving surface 7*a* through a hook portion thereof, and the hook portion can be stuck between adjacent waves, so as to maintain the force application effect of the separation force applying member 101 on the separation force receiving member 7.

In addition, the force receiving surface 7*a* may also be a concave-convex rough surface composed of a plurality of dot-shaped protrusions, or other uneven rough surfaces, which can also achieve the technical effect of this embodiment.

Figure 15:
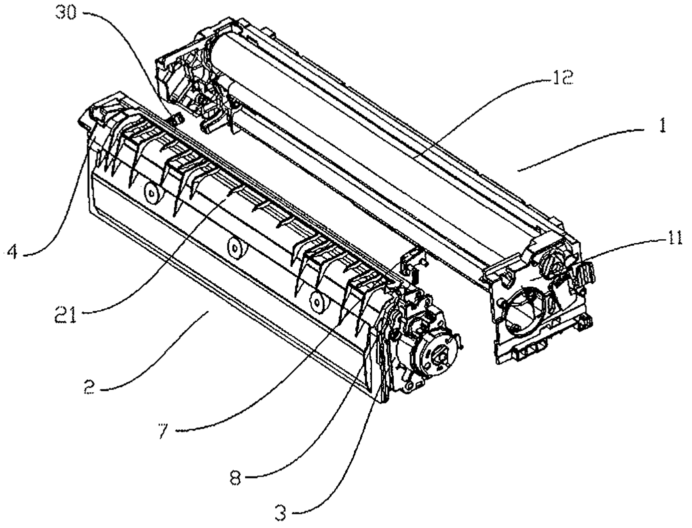
FIG. 15 is a schematic view of the processing cartridge according to an embodiment.

In an embodiment, referring to FIG. 15, the processing cartridge 10 also includes a second resilient member 30, which is provided between the developing cartridge 2 and the drum cartridge 1. The developing cartridge frame 21 is provided with a first positioning protrusion (not shown), the drum cartridge frame 11 is provided with a second positioning protrusion corresponding to the first positioning protrusion (not shown). Both ends of the second resilient member 30 are sleeved on the first positioning protrusion and the second positioning protrusion, respectively, and are located between opposite sides of the developing cartridge 2 and the drum cartridge 1. The developing roller 22 is provided on a side of the developing cartridge frame 21 away from the first positioning protrusion, the photosensitive drum 12 is arranged on a side of the drum cartridge frame 11 11 away from the second positioning protrusion, and the second resilient member 30 enables the developing roller 22 of the developing cartridge 2 to abut against the photosensitive drum 12 of the drum cartridge 1 by elastic force.

Figure 14:
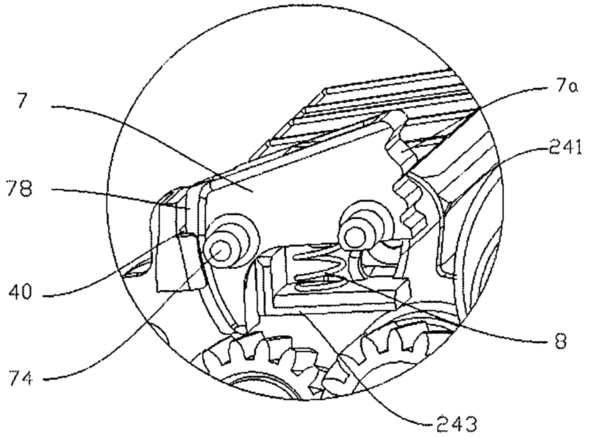
FIG. 14 is an enlarged view of part A in FIG. 13.

In an embodiment, referring to FIG. 14, the developing cartridge 2 further includes a member guide slot 40, and the separation force receiving member 7 is provided with a guide strip 78 located opposite to the force receiving surface 7*a*, and the guide strip 78 is provided in the member guide slot 40 and can move along the member guide slot 40. In this embodiment, the member guide slot 40 is provided on the first end cover 3 of the developing cartridge 2, and the member guide slot 40 cooperates with the first connection groove 241 to enable the separation force receiving member 7 to slide along a specific direction, which has a compact structure and improves the force application effect of each protrusion of the separation force receiving member 7 on the first connection groove 241, the second connection groove 251, and the U-shaped groove 2521.

The processing cartridge provided by the embodiment of a second aspect of the present disclosure will be described below with reference to the accompanying drawings.

In an embodiment, referring to FIGS. 2 to 3 and FIGS. 9 to 11, a processing cartridge 10 is provided. Compared with the processing cartridge 10 provided by the embodiment of the first aspect described above, the separation force receiving member 7 of the processing cartridge 10 of the present embodiment may include a force receiving portion and a force transmitting portion. The force receiving member 7 may include a force receiving portion and a force transmitting portion. The force receiving portion is configured to receive a force that enables the developing cartridge 2 to rotate to the separation position. When the separation force receiving member 7 slides relative to the first end cover 3, the force transmitting portion drives the developing cartridge 2 to rotate.

In this embodiment, the force transferring portion of the separation force receiving member 7 is connected to the developing cartridge 2, either directly or indirectly through other components of the processing cartridge 10. Correspondingly, the separation force receiving member 7 may be provided to be slidable in the M, N directions along with the separation force applying member 101, but need not be provided to be slidable in a direction perpendicular to the M, N directions. Correspondingly, it is not necessary to limit a sliding direction of the force receiving member 7 through cooperation of the sliding guide portion and the guide groove 31.

Compared with conventional processing cartridges, in the processing cartridge provided by the embodiments of the present disclosure, the separation force receiving member cooperating with the separation force applying member in the imaging device is provided on the developing cartridge, and separation force receiving member has the force transmitting portion in contact with the developing cartridge, and the force transmitting portion can drive the developing cartridge to rotate synchronously when the force receiving portion of the separation force receiving member receives the separation force of the separation force applying member, and the developing roller to be separated from the photosensitive drum synchronously, thereby avoiding the separation during cleaning separation.

Those skilled in the art should understand that the features described in the embodiment of the first aspect can be combined with the embodiment to produce corresponding effects, except for the conflict with the structure provided by the embodiment. For example, in an embodiment, the force receiving portion may also have the force receiving surface 7*a* facing the photosensitive drum 12, and the force receiving surface 7*a* is configured to produce sliding friction resistance in response to sliding relative to the force receiving surface 7*a*. The force receiving surface 7*a* may be perpendicular to the direction of the force that enables the developing cartridge 2 to rotate. Since the force receiving surface 7*a* has been described in detail in the embodiment of the first aspect, details will not be repeated herein.

The processing cartridge provided by the embodiment of a third aspect of the present disclosure will be described below with reference to the accompanying drawings.

In an embodiment, referring to FIGS. 2 to 4 and FIG. 16, a processing cartridge 10 is provided including a developing cartridge 2 having a developing roller 22, a drum cartridge 1 having a photosensitive drum 12, and a first end cover 3 and a second end cover 4 provided opposite to each other.

The developing cartridge 2 is rotatably supported on the first end cover 3 and the second end cover 4, and is capable of rotating between a contact position where the developing roller 22 is in contact with the photosensitive drum 12 and a separation position where the developing roller 22 is separated from the photosensitive drum 12.

A first longitudinal end of the developing cartridge 2 is mounted a separation force receiving member 7. The separation force receiving member 7 includes a force receiving portion, and the force receiving portion is configured to receive force that enables the developing cartridge 2 to rotate to the separation position.

The force receiving portion has a force receiving surface 7*a* facing the photosensitive drum, and the force receiving surface 7*a* is configured to produce sliding frictional resistance in response to sliding relative to the force receiving surface 7*a*.

In the processing cartridge provided by this embodiment, the force receiving surface with a high coefficient of friction can produce sliding friction resistance in response to sliding relative to the force receiving surface, and the external separation force applying member does not slip when continuously acting on the force receiving surface, which prevents a risk of disengagement of the separation force receiving member during the stress process, and ensures the imaging effect.

Those skilled in the art should understand that the features described in the embodiment of the first aspect can be combined with the embodiment to produce corresponding effects, except for the conflict with the structure provided by the embodiment. For example, the force receiving surface 7*a* may be serrated, and an arrangement direction of serrations is perpendicular to a rotation axis of the developing roller 22. Alternatively, the force receiving surface 7*a* may be wavy, and an arrangement direction of waves is perpendicular to the rotation axis of the developing roller 22. As another example, the separation force receiving member 7 has a protruding state in which it protrudes relative to the developing cartridge 2 and a retracting state in which it is retracted into the developing cartridge 2.

An imaging device of the embodiment of a fourth aspect of the present disclosure will be described below.

An imaging device includes the separation force applying member 101 and any one processing cartridge 110 in the first to third aspects of the present disclosure. When the separation force applying member 101 exerts force to the separation force receiving member 7 of the processing cartridge 10, the separation force applying member 101 is in contact with the force receiving portion of the separation force receiving member 7 to separate the developing roller 22 of the processing cartridge 10 from the photosensitive drum 12 of the processing cartridge 10.

Since the structure of the above components, the process of separating the developing roller 22 from the photosensitive drum 12 and the corresponding effects have been described in detail in the embodiment of the first aspect, details are not repeated here.

The foregoing descriptions are merely specific embodiments of the present disclosure, but are not intended to limit the protection scope of the present disclosure. As mentioned above, according to the shape, structure and principle of the various embodiments of the present disclosure, many transformations may be obtained. Those of ordinary skill in the art should understand that although the disclosure has been described in detail with reference to the foregoing embodiments, the technical solutions described in the foregoing embodiments can still be modified, or some technical features thereof can be equivalently replaced. Therefore, any variation or replacement within the technical scope disclosed in the present disclosure shall all fall within the protection scope of the present disclosure.

What is claimed is:

1. A processing cartridge comprising:
- a developing cartridge having a developing roller;
- a drum cartridge having a photosensitive drum; and
- a first end cover and a second end cover provided opposite to each other;
- the developing cartridge being rotatably supported on the first end cover and the second end cover, and being capable of rotating between a contact position where the developing roller is in contact with the photosensitive drum and a separation position where the developing roller is separated from the photosensitive drum;
- wherein a first longitudinal end of the developing cartridge is mounted with a separation force receiving member, the separation force receiving member comprises a force receiving portion, a force transmitting portion, and a sliding guide portion, wherein the force receiving portion is configured to receive a force that enables the developing cartridge to rotate to the separation position, the force transmitting portion is movably connected to the developing cartridge, the sliding guide portion and the first end cover are relatively slidably provided, the force transmitting portion drives the developing cartridge to rotate synchronously when the separation force receiving member slides relative to the first end cover.

2. The processing cartridge according to claim 1, wherein the first longitudinal end of the developing cartridge has a first connection groove, the force transmitting portion is inserted into the first connection groove to form a movable connection with the developing cartridge, and the force transmitting portion is in contact with a wall of the first connection groove, the first connection groove is formed on a bearing plate configured to support the developing roller.

3. The processing cartridge according to claim 1, wherein a guide groove extending linearly is formed on the first end cover, and the sliding guide portion is slidably provided in the guide groove, the force receiving portion has a force receiving surface perpendicular to an extending direction of the guide groove.

4. The processing cartridge according to claim 3, wherein the separation force receiving member further comprises an anti-rotation portion having an initial position aligned with the guide groove;
- when the developing cartridge is located at the contact position, the anti-rotation portion is located at the initial position, and the separation force receiving member is capable of rotating around the sliding guide portion;
- when the developing cartridge rotates from the contact position to the separation position, the anti-rotation portion enters the guide groove from the initial position to prevent the separation force receiving member from rotating;
- wherein a first resilient member is provided between the developing cartridge and the separation force receiving member, and when the developing cartridge is located at the contact position, the anti-rotation portion is kept at the initial position under an action of the first resilient member.

5. The processing cartridge according to claim 4, wherein the first longitudinal end of the developing cartridge has a gear cover, a second connection groove is formed on the gear cover, the anti-rotation portion extends through the second connection groove to form a movable connection with the gear cover, and the anti-rotation portion is in contact with a wall of the second connection groove.

6. The processing cartridge according to claim 4, wherein a first resilient member is provided between the developing cartridge and the separation force receiving member;

the separation force receiving member is formed with a receiving chamber, one end of the first resilient member is provided in the receiving chamber and abuts against the separation force receiving member, and the other end of the first resilient member abuts against the developing cartridge.

7. The processing cartridge according to claim 1, wherein the force transmitting portion and the sliding guide portion are provided on opposite sides of the separation force receiving member, respectively.

8. The processing cartridge according to claim 1, further comprises a second resilient member provided between the developing cartridge and the drum cartridge, wherein the second resilient member enables the developing roller of the developing cartridge to abut against the photosensitive drum of the drum cartridge by elastic force.

9. The processing cartridge according to claim 1, wherein the developing cartridge further comprises a member guide slot, the separation force receiving member is provided with a guide strip located opposite to the force receiving portion, the guide strip is provided in the member guide slot and is capable of moving in the member guide slot.

10. A processing cartridge comprising:

a developing cartridge having a developing roller;

a drum cartridge having a photosensitive drum; and a first end cover and a second end cover provided opposite to each other;

the developing cartridge being rotatably supported on the first end cover and the second end cover, and being capable of rotating between a contact position where the developing roller is in contact with the photosensitive drum and a separation position where the developing roller is separated from the photosensitive drum;

wherein a first longitudinal end of the developing cartridge is mounted with a separation force receiving member, the separation force receiving member comprises a force receiving portion and a force transmitting portion, wherein the force receiving portion is configured to receive a force that enables the developing cartridge to rotate to the separation position, the force transmitting portion drives the developing cartridge to rotate when the separation force receiving member slides relative to the first end cover.

11. The processing cartridge according to claim 10, wherein the force receiving portion has a force receiving surface facing the photosensitive drum, and the force receiving surface is configured to produce sliding frictional resistance in response to sliding relative to the force receiving surface.

12. The processing cartridge according to claim 11, wherein the force receiving surface is serrated, and an arrangement direction of serrations is perpendicular to a rotation axis of the developing roller; or, the force receiving surface is wavy, and an arrangement direction of waves is perpendicular to the rotation axis of the developing roller.

13. The processing cartridge according to claim 11, wherein the force receiving surface is perpendicular to a direction of a force that enables the developing cartridge to rotate.

14. The processing cartridge according to claim 10, wherein the first longitudinal end of the developing cartridge has a first connection groove, the force transmitting portion is inserted into the first connection groove to form a connection with the developing cartridge, and the force transmitting portion is in contact with a wall of the first connection groove.

15. The processing cartridge according to claim 10, wherein the separation force receiving member has a protruding state in which the separation force receiving member protrudes relative to the developing cartridge and a retracting state in which the separation force receiving member is retracted into the developing cartridge.

16. A processing cartridge comprising:

a developing cartridge having a developing roller;

a drum cartridge having a photosensitive drum; and a first end cover and a second end cover provided opposite to each other;

the developing cartridge being rotatably supported on the first end cover and the second end cover, and being capable of rotating between a contact position where the developing roller is in contact with the photosensitive drum and a separation position where the developing roller is separated from the photosensitive drum;

wherein a first longitudinal end of the developing cartridge is mounted with a separation force receiving member, the separation force receiving member comprises a force receiving portion configured to receive a force that enables the developing cartridge to rotate to the separation position and a force transmitting portion configured to drive the developing cartridge to rotate synchronously when the separation force receiving member slides relative to the first end cover;

the force receiving portion has a force receiving surface facing the photosensitive drum, and the force receiving surface is configured to produce sliding frictional resistance in response to sliding relative to the force receiving surface.

17. The processing cartridge according to claim 16, wherein the force receiving surface is serrated, and an angle formed between an arrangement direction of serrations and a rotation axis of the developing roller is 45° to 135°;

or, the force receiving surface is wavy, and an angle formed between an arrangement direction of waves and the rotation axis of the developing roller is 45° to 135°.

18. The processing cartridge according to claim 17, wherein when the force receiving surface is serrated, the serrations extend in a direction parallel to the rotation axis of the developing roller;

or, when the force receiving surface is wavy, waves extend in a direction parallel to the rotation axis of the developing roller.

19. The processing cartridge according to claim 17, wherein when the force receiving surface is serrated, the serrations extend in a direction intersecting the rotation axis of the developing roller, and an intersection angle between a straight line in which the serrations extend and the rotation axis of the developing roller is less than 45°;

or, when the force receiving surface is wavy, the waves extend in a direction intersecting the rotation axis of the developing roller, and an intersection angle between a straight line in which the waves extend and the rotation axis of the developing roller is less than 45°.

20. The processing cartridge according to claim 16, wherein the separation force receiving member drives the developing cartridge to rotate when the separation force receiving member slides relative to the first end cover.

* * * * *